Figure 1:
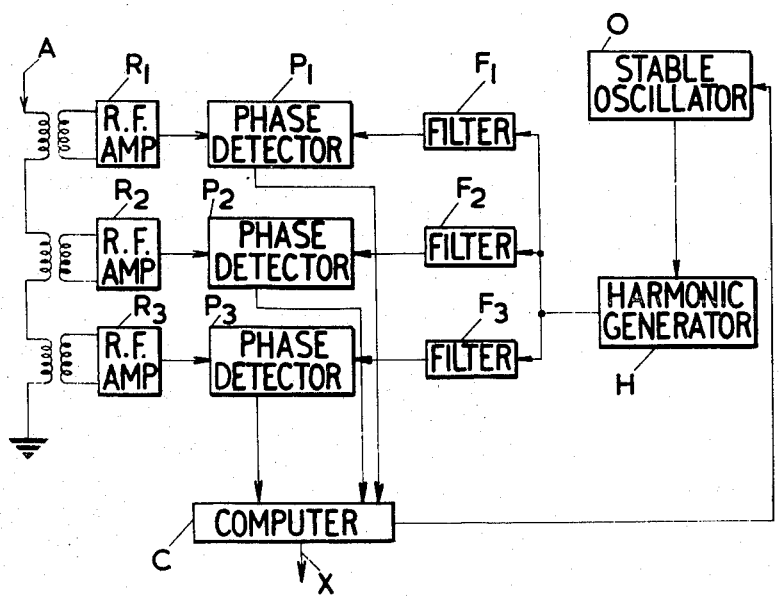

United States Patent Office 3,237,196
Patented Feb. 22, 1966

3,237,196
RADIO NAVIGATIONAL AIDS
Donald Edward Hampton, Blackwater, near Camberly, Surrey, England, assignor to Minister of Aviation in Her Majesty's Government of the United Kingdom of Great Britain and Northern Ireland, London, England
Filed Mar. 13, 1963, Ser. No. 264,799
Claims priority, application Great Britain, Mar. 14, 1962, 9,774/62; Dec. 31, 1962, 49,022/62
12 Claims. (Cl. 343—112)

The present invention relates to radio navigational aids suitable for determining the position of a mobile craft such as an aircraft. One proposed form of navigational aid consists of a constant-frequency transmitter on the ground and a receiver, a constant-frequency oscillator and a phase comparator in an aircraft. The frequencies of the transmitter and, in effect, of the aircraft oscillator are the same. As the aircraft moves with respect to the ground transmitter, the phase comparator will indicate a phase-change which is proportioned to the change in radial distance of the aircraft from the ground transmitter, the phase changing by $2\pi$ radians for each change of radial distance of one wavelength at the transmitter frequency. Then, if the phase difference as measured by the phase comparator is known at the start of a journey, the distance of the aircraft from the ground transmitter will always be known from changes in readings of the phase comparator. That is to say, it will be known that the aircraft lies on a circle of known radius with the ground transmitter at its centre. Clearly, if two spaced ground transmitters are provided and two phase comparisons are made in the aircraft, then under similar conditions, the position of the aircraft may be determined by triangulation.

The foremost requirement for the accuracy of the above-mentioned system is that all of the oscillators should be highly stable, for if any one of them should drift in frequency then a corresponding one of the distance indications will be in error. Whilst very high stability can be attained for ground transmitters, for example by reference to standard clocks, such stability is not easy to attain for oscillators carried by aircraft where light weight and low cost are of paramount importance.

It is an object of the present invention to provide navigational apparatus for use in a mobile craft and employing a stable oscillator in which the inherent stability requirements of the stable oscillator are not so strict. This enables a cheaper and simpler stable oscillator to be employed.

The ground equipment required for use in conjunction with the present invention consists basically of three geographically spaced, highly frequency-stable ground transmitting stations. These stations are so situated that the transmissions of all of them may be received at a practicable signal strength over a considerable area. If, as is proposed, the ground transmitting stations transmit frequencies in the very low frequency (V.L.F.) band, then they may be spaced of the order of thousands of miles apart.

According to the present invention, there is provided radio navigational apparatus for obtaining an indication of the position of a mobile craft and comprising at least three radio transmitting stations, geographically spaced apart, for providing signals stable in frequency. The mobile craft includes stable oscillator means for providing a reference signal, receiver means for receiving the signals provided by the said radio transmitting stations, phase detector means connected to the stable oscillator means and to the receiver means for making separate comparisons of the phases of signals derived from the said reference signal with the phases of signals derived by the said receiver means from the signals provided by the said radio transmitting stations to provide a corresponding number of separate outputs, and controlling means connected to the outputs of the phase detector means and to the stable oscillator means to adjust the phase of the reference signal so that the outputs of the phase detector means are as nearly as possible compatible with the instantaneous position of the mobile craft. The controlling means comprise computing means connected to the said stable oscillator means and to the outputs of the said phase detector means for computing parameters of a triangle formed by the intersection of circular arcs having their centers at the positions of the said three radio transmitting stations and having their radii calculated from the outputs of the said phase detector means to provide an output derived from the said parameters for controlling the said stable oscillator to reduce the inradius of the said triangle toward zero. The stable oscillator means includes a stable oscillator which may be controlled directly in phase. Alternatively, the stable oscillator means may also include a phase shifter, such as a goniometer, the phase shift through which may be controlled to adjust the phase of the reference frequency signals.

Figure 2A:
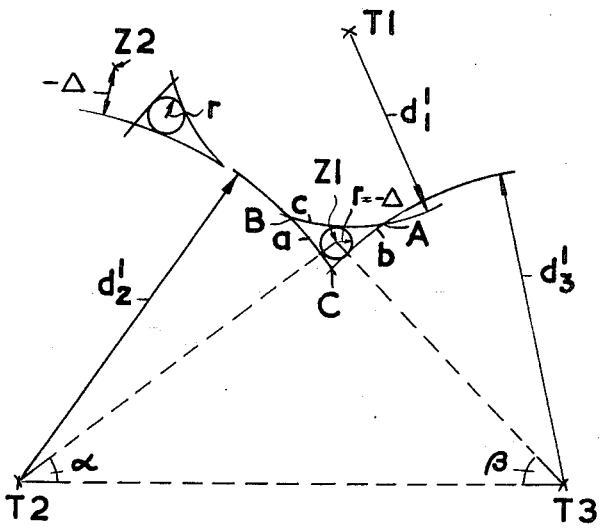
Figure 2B:
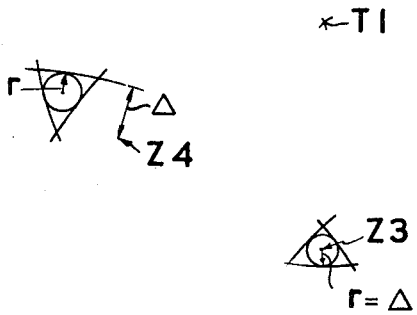
Figure 3:
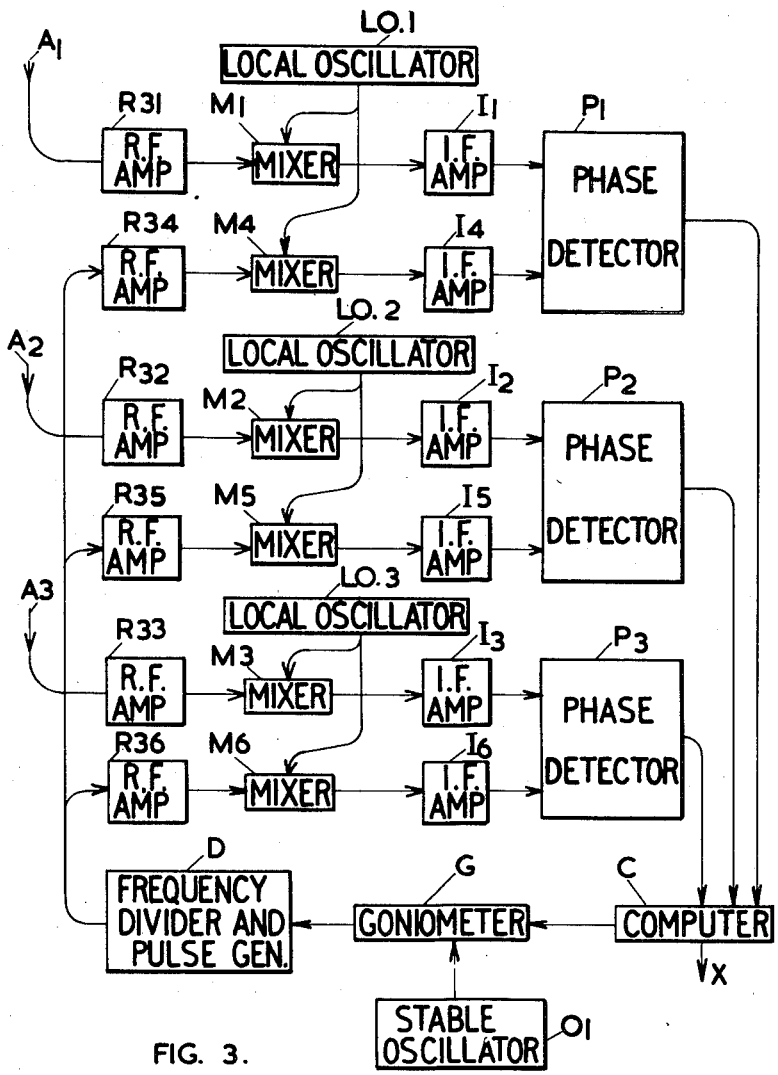
Figure 4:
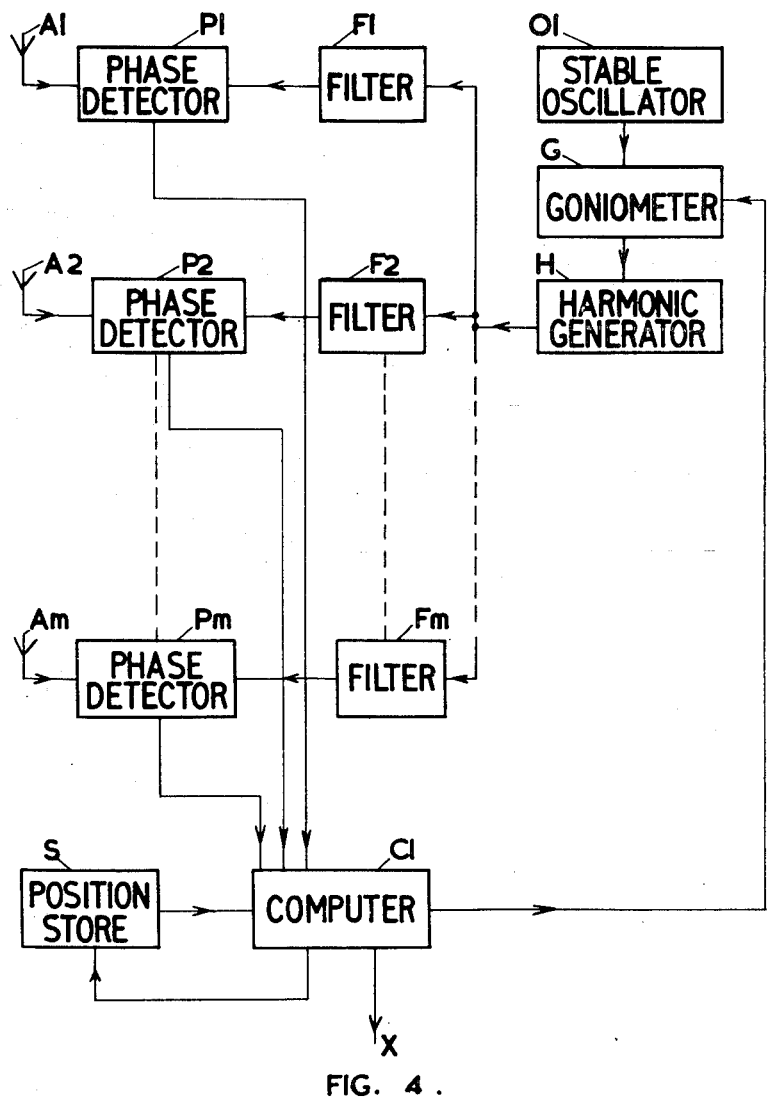

In order that the invention may be more clearly understood, embodiments thereof will now be described, by way of example, with reference to the accompanying drawings, in which:

FIGURE 1 is a block schematic diagram showing the basic circuit requirements for one form of navigational apparatus for use in a mobile craft, FIGURES 2(a) and 2(b) are diagrams illustrating the operation of the navigational apparatus shown in FIGURE 1, FIGURE 3 is a circuit diagram showing one possible arrangement of component parts for the basic circuit shown in FIGURE 1, and FIGURE 4 is a diagram illustrating the circuit of a modified form of navigational apparatus.

FIGURE 1 shows three signal receiving channels comprising three radio-frequency amplifiers R1, R2 and R3 fed from a common aerial system A. The amplifiers R1, R2 and R3 feed three phase detectors P1, P2 and P3 respectively. The outputs of the phase detectors are fed to a computer C. A stable oscillator O operating at a frequency of 1 kc./s. has its output applied to the input of an harmonic generator H. The output of the harmonic generator H is applied to three reference frequency channels comprising three band-pass filters F1, F2 and F3 the outputs of which are applied to the phase detectors P1, P2 and P3 respectively. The filters F1, F2 and F3 are tuned to pass only the harmonics 16 kc./s., 17 kc./s. and 18 kc./s., respectively, of the oscillator O. The output of the computer C is applied to the stable oscillator O to control its phase.

FIGURES 2(a) and 2(b) show ground plans of three geographically spaced transmitters T1, T2 and T3 which are arranged to transmit at the highly stable frequencies of 16 kc./s., 17 kc./s. and 18 kc./s., respectively These figures will be referred to hereinafter to assist in the explanation of the operation of the navigational apparatus shown in FIGURE 1.

The operation of the navigational apparatus shown in FIGURE 1 is as follows. Signals from the three transmitters T1, T2 and T3 (FIGURE 2) are received and amplified by the radio-frequency amplifiers R1, R2 and R3 respectively which are tuned to the respective frequencies of the transmitters. The output signals from the amplifiers R1, R2 and R3 are compared in phase with the signals of the same frequency from the filters F1, F2 and F3 in the phase detectors P1, P2 and P3 respectively. Then, theoretically, the distances of a mobile craft carrying the apparatus shown in FIGURE 1 from the transmitters T1, T2 and T3 may be computed by monitoring the outputs of the phase detectors P1, P2 and P3 respectively.

The distance $d_1$ of the craft from the transmitter T1 is given by the equation:

$$d_1 = \phi_1 \cdot \lambda_1 / 2\pi = \phi_1 \cdot c. / 2\pi f_1 \quad \cdots \quad (1)$$

where $\phi_1$ is the phase difference at the phase detector P1 between the signals from the amplifier R1 and the filter F1, $\lambda_1$ is the wavelength in air of the signal from the transmitter T1, $f_1$ is the frequency (16 kc./s.) of the transmitter T1 and $c$ is the velocity of light in air. A simple phase detector cannot, of course, discriminate between phase difference separated by intervals of $2\pi$ radians, but the distance $d_1$ is known at the start of a journey and the phase changes are continuously monitored by the phase detector P1 so that the distance $d_1$ is continuously measured.

By similar means the distance $d_2$ and $d_3$ from the craft to the transmitters T2 and T3 respectively are also measured. Then, theoretically, the position of the craft may be computed, by triangulation, from any two of the known distances $d_1$ to $d_3$. However, there will be errors occurring in the system, the main errors being due to variations in the velocity of propagation of the radio waves from the transmitters T1, T2 and T3 to the craft, and due also to drift in phase of the oscillator O in the craft.

In practice it may be assumed, without introducing intolerable inaccuracy into the system, that all the errors are due to a drift in phase of the oscillator O.

If the oscillator O has a frequency of $f$ cycles/sec., the frequency $f_1$ at the output of the harmonic generator H is the $n_1$th harmonic of this frequency (i.e. $f_1 = n_1 f$); and if the phase of the oscillator O changes by a phase angle $\psi$, the phase of the $n_1$th harmonic $f_1$ will change by a phase $n_1\psi$. It follows from Equation (1) that the true distance $d_1$ will be given by the equation:

$$d_1 = \phi_1 \cdot \lambda_1 / 2\pi - n_1 \psi c / 2\pi n_1 f$$

i.e.

$$d_1 = \phi_1 \cdot \lambda_1 / 2\pi - \psi c / 2\pi f \quad \cdots \quad (2)$$

The error term is the second expression on the right-hand side of Equation (2). It will be seen that this term is independent of the harmonic used and will be the same for the measurement of each of the distances $d_1$ to $d_3$. It follows that the distance $d_1'$, $d_2'$ and $d_3'$ computed from the phase angles $\phi_1$, $\phi_2$ and $\phi_3$ measured by the phase detectors P1 to P3 are related to the true distances by the equations:

$$d_1 = d_1' - \Delta$$
$$d_2 = d_2' - \Delta$$
$$d_3 = d_3' - \Delta$$

where $\Delta$ is the common error in the distance measurements, having the same magnitude and sign in all three equations (i.e. $\Delta = \psi c / 2\pi f$).

If $(x, y)$ are the true co-ordinates of the craft in a rectangular co-ordinate system and $(x_1, y_1)$, $(x_2, y_2)$ and $(x_3, y_3)$ are the known co-ordinates, in the system, of the same transmitters T1 to T3 respectively, then:

$$(x-x_1)^2 + (y-y_1)^2 = (d_1' - \Delta)^2$$
$$(x-x_2)^2 + (y-y_2)^2 = (d_2' - \Delta)^2$$
$$(x-x_2)^1 + (y-y_2)^2 = (d_3' - \Delta)^2$$

The values of $x_1$ to $x_3$, $y_1$ to $y_3$ and $d_1'$ to $d_3'$ are known and stored in the computer C. The approximate values of $x$ and $y$ are also known from previous determinations and stored in the computer C. This being so, these equations can be solved for $x$, $y$ and $\Delta$ by the computer C. The computer feeds back a signal, proportional to the value of $\Delta$, to the oscillator O to correct its phase so that the error phase angle $\psi$ is made zero. If necessary, the computer C may resolve the sign of $\Delta$ by successive trials to bring it to zero. When $\psi$ has been brought to zero, the co-ordinates $x$ and $y$ of the craft are shown or printed out at an output X of the computer C.

Figure 2B:

A simpler method of computation of the true co-ordinates of the craft is illustrated in FIGURE 2. FIGURE 2(a) shows the ground plan of the three transmitters T1, T2 and T3 with the true positions of two aircraft superposed on it at Z1 and Z2. Arcs of circles are drawn on the figure with their centres at the transmitters T1, T2 and T3 and their radii having two different sets of values for $d'$, $d_2'$ and $d_3'$. In each case, the distance error $\Delta$ is negative. It will be seen that in each case the three arcs cut one another to form a triangle. In other words, the mobile craft appears to be in three separate geographical situations, these situations being determined by three separate triangulations about different pairs of the transmitters T1, T2 and T3. In the case of the aircraft position Z1, the triangle formed by the intersections of the three arcs is given to the connotation A.B.C. with angles A, B, C and sides of lengths $a$, $b$ and $c$.

Since the distances from the transmitters to the craft will usually be large, the arcs of the circles may, to a first approximation, be considered to be straight lines joining the apices of the triangle A.B.C. Also, since the computation process and the adjustment of the phase of the oscillator are virtually continuous, the angles $\alpha$ and $\beta$ subtended by the craft at the transmitters T1 and T2 respectively to the line joining the transmitters T1 and T2 will be approximately known. Therefore, the angle $C = \alpha + \beta$ is approximately known and can be stored in the computer C. Similarly, the angles A and B of the triangle will also be approximately known and can also be stored in the computer. The length $a$ may also be computed by determining the points B and C at which the arcs of the circles centred on the transmitters T1 and T3 cut the arc of the circle centred on the transmitter T2. The in-radius, $r$, of the triangle A.B.C. may then be computed in the computer C from the equation:

$$r = a \cdot \sin B \cdot \sin C / (\sin A + \sin B + \sin C) \quad \cdots \quad (3)$$

or alternatively $$r = a \cdot b \cdot \sin C / (a + b + c) \quad \cdots \quad (4)$$

or alternatively $$r = a \cdot \sin \tfrac{1}{2} B \cdot \sin \tfrac{1}{2} C / \cos \tfrac{1}{2} A \quad \cdots \quad (5)$$

The computer C can then compute the value of the in-radius $r$ and change the phase of the oscillator O by successive approximations until $r$ becomes zero. The three arcs of circles will then all cut at a point which will be the true position, Z1, of the craft. That is to say, the phase of the oscillator O will now be compatible with the mobile craft being in a single geographical location. New values of the angle A, B and C will be computed and the position of the craft presented at the output of the computer.

In cases in which the craft lies outside the triangle formed by the transmitters T1, T2 and T3, as exemplified by the craft position Z2, the position Z2 will lie outside the triangle formed by the intersections of the arcs of the circles of radius $d_1'$, $d_2'$ and $d_3'$. However, since the distance errors $(-\Delta)$ are the same for each arc, the true distances can still be obtained by adjusting the phase of the oscillator O until the in-radius $r$ of the triangle becomes zero.

FIGURE 2(b) shows two cases in which true positions of craft are shown at Z3 and Z4 and the distances error $\Delta$ is positive in each case. It will be seen that in each case the true distances can again be obtained by adjusting the phase of the oscillator O so that the in-radius $r$ of the triangle formed by intersections of the arcs of circles having centres at the three transmitters T1 to T3 is zero. Special cases occur when the error $\Delta$ is negative and the craft lies on a line joining two, say the transmitters T1 and T2, of the transmitters T1, T2 and T3, for then no triangle is formed by the intersections of arcs of circles. In that case, the phase of the oscillator O has only to be adjusted so that the appropriate two of the distances, $d_1'$ and $d_2'$ say, have a sum which is the distance between the same two transmitters T1 and T2.

FIGURE 3 shows a practical embodiment of the present invention which has three signal receiving channels including three high-Q radio-frequency amplifiers R31, R32 and R33 which are shown, for convenience, as being fed by three separate aerials A1, A2 and A3 respectively. The amplifiers R31 to R33 are tuned to frequencies (16 kc./s., 17 kc./s. and 18 kc./s., say) corresponding to the transmission frequencies of transmitters such as the transmitters T1 to T3. The outputs of the amplifiers R31 to R33 are applied to three mixers M1, M2 and M3 respectively wherein the radio-frequency signals are mixed with the outputs of three local oscillators LO1, LO2 and LO3 respectively to produce suitable intermediate frequency signals which are applied to high-Q intermediate-frequency amplifiers I1, I2 and I3, respectively.

A stable oscillator O1 is provided which feeds two quadrature signals to two stator coils (arranged at right angles) of a goniometer G. The stable oscillator O1 may be a 5 mc./s. overtone oscillator and temperature stabilised. The attitude of the rotor (not shown) of the goniometer G is controlled by a computer C, which has a similar function to the computer C shown in FIGURE 1. The control of the attitude of the rotor of the goniometer G, in effect, controls the phase of the output of the oscillator O1. The output from the rotor of the goniometer G is applied to a frequency divider and pulse generator D which produces pulses at a pulse recurrence frequency of 1000 pulses per second. The ouput of the frequency divider and pulse generator D is applied to the inputs of three high-Q R.F. amplifiers R34, R35 and R36 respectively. These amplifiers are tuned to the same frequencies, 16 kc./s., 17 kc./s. and 18 kc./s. say, as the amplifiers R31, R32 and R33 respectively and have such a high Q that they act as harmonic filters (F1, F2 and F3 of FIGURE 1) to select the appropriate harmonics of the output of the frequency divider and pulse generator D.

The outputs of the amplifiers R34, R35 and R36 are applied to mixers M4, M5 and M6 respectively in which the signals from the amplifiers are mixed with the outputs of the local oscillators LO1 to LO3 respectively. The outputs of the mixers M4 to M6 are applied to high-Q intermediate-frequency amplifiers I4, I5 and I6 respectively. The outputs of the amplifiers I4 to I6 are applied to the phase detectors P1 to P3 respectively. The outputs of the phase detectors are applied to inputs of the computer C. The position of the craft carrying the apparatus is given at an output X of the computer C.

The pair of signal channels R31, M1, I1 and R34, M4, I4 are substantially identical and are temperature stabilised. The channel R34, M4, I4 acts as a phase reference channel and, because of the high Q of its amplifiers, has a substantially continuous-wave output, corresponding to that of the filter F1 shown in FIGURE 1, but at an intermediate frequency, of say 525 kc./s. The local oscillator LO1 is common to the two channels and so need not be abnormally stable. The phase detector P1 may be a servo-operated phase detector. The pairs of signal channels R32, M2, I2, R35, M5, I5 and R33, M3, I3, R36, M6, I6, the local oscillators LO2 and LO3 and the phase detectors P2 and P3 are similar in form and perform similar functions.

In the embodiment shown in FIGURE 3, the phase comparisons take place at intermediate frequency but the outputs from the phase detectors P1 to P3 will be the same as from the phase detectors of similar reference shown in FIGURE 1.

The computer C may be an analogue computer or a digital computer. If it be a digital computer it may be a suitably programmed computer of any convenient known type, but in order to save space, weight and cost it is preferably a computer with a fixed program and parts arranged to perform only the required computations. Also, the phase detectors P1 to P3 may be of the type having a digital output for feeding directly to the computer. The goniometer G may also include a digital servo mechanism actuated directly by the output of the computer C. The stable oscillator O (FIGURE 1) or O1 (FIGURE 3) is no required to have an exceptionally high long-term stability. An oscillator having a short-term stability of one part in $10^9$ per hour is sufficiently stable to enable the invention to be carried out without undue demands being made on the speed of operation of the computer C.

FIGURE 4 is a diagram of a modification of the navigational aid illustrated in FIGURES 1 and 3.

FIGURE 4 shows a number, m, of aerials A1, A2 to Am feeding an equal number of phase detectors P1, P2 to Pm. Each of these phase detectors may be preceded in the circuit by suitable amplifiers and, if necessary, a frequency-changing mixer as in the case of the embodiment shown in FIGURE 3, or alternatively may comprise a phase comparison receiver as described in co-pending United States application Serial No. 323,002, filed November 12, 1963, by Charles R. N. Barnard for "Radio Phase-Comparison Receivers," assigned to the assignee of the instant application and having a priority date of November 16, 1962, based upon British patent application No. 43,410/62. The outputs from the phase detectors P1 to Pm are applied to a computer C1. An output of the computer C1 is applied to a store S termed the position store. The position store S may be of any suitable known type; for instance, it may be of the type described in prior copending U.S. patent application Serial No. 181,371, filed March 21, 1962. An output of the position store S is connected to an input of the computer C1.

A stable oscillator O1 is connected to the windings of a goniometer G so that rotation of the spindle of the goniometer will vary the phase of the output signal from the goniometer. The output signal from the goniometer G is applied to an harmonic generator H. The output of the harmonic generator H is applied through filters F1, F2 to Fm to the phase detectors P1, P2 to Pm respectively so that these phase detectors are fed with appropriate harmonics of the frequency of the stable oscillator O1. These harmonics are such that their frequencies are the same as those derived from the aerials A1, A2 to Am to which amplifier circuits (not shown) associated with the phase detectors P1, P2 to Pm respectively are tuned. Thus direct phase comparison can be made in the phase detectors between signals related in phase to the signals picked up by the aerials A and signals related in phase to the signals at the output of the goniometer G. An output of the computer C1 is connected to the goniometer G so as to control the phases of the signals derived therefrom in a manner to be described hereinafter. It will, of course, be understood that if, for example, any one of the phase detectors P1 to Pm is preceded by amplifiers and a frequency-changing mixer to amplify and change the frequency of the signal received by its associated aerial, similar amplifiers and a similar mixer should precede the phase detector to amplify and change the frequency of signals from the stable oscillator O1, in a manner similar to that illustrated in FIGURE 3.

The operation of the radio navigational apparatus shown in FIGURE 4 is as follows. The amplifier circuits (not shown) associated with the phase detectors P1, P2 to Pm are such that a phase comparison is made in each phase detector between a signal derived from the goniometer G and a signal derived from a different one of a number m of spaced ground transmitting stations T1 to Tm (not shown). As hereinbefore explained with reference to the true distances $d_1$ to $d_3$, the outputs of the phase detectors P1 to P$m$ will vary as the true distances $d_1$ to $d_m$ between the craft carrying the apparatus and the transmitting station T1 to T$m$, respectively, vary. The outputs of the phase detectors P1 to P$m$ are continuously supplied to the computer C1. The computer C1 monitors these outputs and thereby obtains measurements $d_1'$ to $d_m'$ of the distances from the craft to the transmitting stations T1 to T$m$ respectively. These measured distances may be in error for various reasons such as drift in the frequency of the oscillator O1 or changes in the various electromagnetic propagation paths involved between the craft and the transmitting stations and may therefore be incompatible with each other.

At the start of a journey, the distances $d_1$ to $d_m$ are accurately known and are placed in the position store S. Also, the computer is programmed to interpret the outputs of the phase detectors P1 to P$m$ at the start of the journey as representing these true distances. That is to say, the measured distances $d_1'$ to $d_m'$ are made equal to the known true distances $d_1$ to $d_m$ respectively. As the craft proceeds on its journey, the true distances $d_1$ to $d_m$ will no longer be accurately known, and the contents of the position store S are then regarded as only estimates $e_1$ to $e_m$ of the true distances $d_1$ to $d_m$ respectively. The computer C1 now calculates the squared error between the estimated distances $e_1$ to $e_m$ and the measured distances $d_1'$ to $d_m'$. The squared error $\epsilon^2$ is calculated as:

$$\epsilon^2 = \sum_{i=1}^{m} (e_i - d_i')^2$$

The computer C1 now calculates revised values of $e_1$ to $e_m$ which make $\epsilon^2$ a minimum, taking into account that the craft can only be at one place at any given instant. Such a calculation may be done by successive approximations. Let the values of $e_1$ to $e_m$ which give a minimum value of $\epsilon^2$ be denoted $b_1$ to $b_m$ respectively. These values are passed to the position store S to replace the original values of $e_1$ to $e_m$.

The computer C1 now calculates an error value $\delta$ such that:

$$\delta = \frac{1}{m} \sum_{i=1}^{m} (b_i - d_i')$$

An electrical signal proportional to the error value $\delta$ is fed back to the goniometer G which shifts the phase of the signal derived therefrom so that $\delta$ is made as nearly as practicable zero. As this takes place, the values of the squared error $\epsilon^2$ and $\delta$ are recalculated and new estimated distances $b_1$ to $b_m$ are placed in the position store S.

The estimated position of the craft satisfying the condition of $\epsilon^2$ being a minimum is calculated and given by the computer at an output X.

If the sole errors in the measurement of $d_1'$ to $d_m'$ are due to drift in the phase of the oscillator O1, then both $\epsilon^2$ and $\delta$ can theoretically be made zero and the estimated distances $b_1$ to $b_m$ will be equal to the true distances $d_1$ to $d_m$. The measured distances $d_1'$ to $d_m'$ will then be compatible with the craft being in a single geographical location. If other errors occur, this may not be true, but the estimated distances $b_1$ to $b_m$ will be good approximations to the true distances $d_1$ to $d_m$.

Many variations of the embodiment described with reference to FIGURE 4 will occur to those versed in the art. Thus, for example, although the position store S has been described as storing true or estimated distances, it can, of course, store true or estimated positions of the craft, the computer calculating the distances therefrom. In this case, the output X may be taken from the store directly. Furthermore, the position store S may form a physical part of the computer C1. Although the calculations have been described in terms of distances, the calculations may be made in equivalent terms such as phase angles.

The embodiment described with reference to FIGURE 4 comprises a number $m$ of aerials A and of phase detectors P for use in conjunction with a number $m$ of ground stations T. Clearly, the number $m$ must be greater than two, otherwise $\epsilon^2$ could be reduced to zero for any value of phase angle introduced by the goniometer G. The optimum practical value for $m$ is four. However, it is not essential that the number of phase detectors P should be equal to the number of ground transmitting stations T used in conjunction with navigation apparatus. Thus, for example, the ground transmitting stations may be arranged to transmit in time division multiplex such that each transmission is received separately by the craft. One phase detector may then be operated in synchronism with the transmissions to provide separate outputs indicative of the various phase and distance measurements.

I claim:
1. Radio navigational apparatus comprising three radio transmitting stations geographically spaced apart for transmitting respectively distinct signals, receiver means in a mobile craft for receiving the signals transmitted by said stations, stable oscillator means in said craft for providing a reference signal, phase detector means in said craft connected to said stable oscillator means and to said receiver means for making separate comparisons of the phases of signals derived from the said reference signal with the phases of signals derived by said receiver means from the signals transmitted by said radio transmitting stations to provide three separate outputs respectively representing the phase differences between the phases of signals derived from said three radio transmitting stations and the phases of signals derived from said reference signal, and control means coupled to the outputs of said phase detector means and to said stable oscillator means for controlling said stable oscillator means to adjust the phase of said reference signal so that the outputs of said phase detector means are as nearly as possible compatible with the instantaneous position of the mobile craft, said control means comprising computing means connected to said stable oscillator means and to the outputs of said phase detector means for computing parameters of a triangle formed by the intersections of circular arcs having their centers at the positions of said three radio transmitting stations and having their radii calculated from the outputs of said phase detector means to provide an output derived from the said parameters for controlling said stable oscillator means to reduce the in-radius of said triangle toward zero.

2. Radio navigational apparatus for obtaining an indication of the position of a mobile craft, comprising transmitting means including at least three radio transmitting stations geographically spaced from one another for providing signals stable in frequency, receiver means in the mobile craft for receiving signals from said radio transmitting stations, stable oscillator means in said craft for providing a reference frequency signal, phase detector means in said craft connected to said receiver means and to said stable oscillator means for making separate comparisons of the phases of signals derived from said reference frequency signal with the phases of signals derived by said receiver means from said radio transmitting stations to provide a corresponding number of separate outputs, storage means in said craft for storing a set of parameters related to an estimate of the position of the mobile craft, and computing means connected to the outputs of said phase detector means, to said storage means and to said stable oscillator means, said computer means including means for monitoring said outputs of said phase detector means to obtain measurements of the distances between said mobile craft and each of said radio transmitting stations, said computer means also including means for computing the sum of the squares of the errors between said measurements and corresponding distances derived from the parameters stored in the storage means, said computer means being operative to compute a new set of parameters related to a new estimate of the position of the mobile craft such that the said sum of the squares of the errors is reduced to a minimum, and operative to place the new set of parameters in the storage means, and means in said computer means for calculating the mean error between the said measurements and corresponding distances derived from the said new estimate and operative to provide an output to control said stable oscillator means so that said mean error is reduced to a minimum.

3. Radio navigational apparatus for obtaining an indication of the position of a mobile craft, comprising three geographically spaced radio transmitting stations for transmitting signals at three different frequencies, receiver means in the mobile craft for receiving the signals transmitted by said radio transmitting stations, stable oscillator means in said craft for providing a reference frequency signal at an output thereof, an harmonic generator connected to said output of said stable oscillator means, filter means connected to an output of said harmonic generator for selecting harmonics of the reference frequency signal having three different frequencies corresponding respectively to three different frequencies of signals derived by said receiver means from the signals transmitted by said three radio transmitting stations, three phase detectors each connected to said receiver means and to said filter means to receive respectively a separate one of said harmonics and the corresponding one of the said signals derived by said receiver means, and computer means coupled to said phase detectors and to said oscillator means for computing parameters of a triangle formed by the intersections of circular arcs having their centers at the positions of the three transmitting stations and their radii calculated from the outputs of the said phase detectors, said computer means including means operative to provide an output based on said computed parameters for controlling said stable oscillator means to reduce the in-radius of said triangle toward zero.

4. Radio navigational apparatus for obtaining an indication of the position of a mobile craft, comprising at least three geographically spaced transmitting stations for transmitting three distinct signals each of which is stable in frequency, receiver means in the mobile craft for receiving the signals from said radio transmitting stations, stable oscillator means in said craft for providing a reference frequency signal at an output thereof, an harmonic generator connected to the said output of the said harmonic generator for selecting harmonics of the reference frequency signal having frequencies corresponding to the frequencies of at least three signals derived by the receiver means from the radio transmitting stations, a plurality of phase detectors each connected to the receiver means and to the filter means to receive respectively a separate one of the said harmonics and the corresponding one of the said signals derived from the radio transmitting stations, storage means for storing a set of parameters related to an estimate of the position of the mobile craft, and computer means connected to the said storage means, to the said stable oscillator means and to the outputs of the said plurality of phase detectors and including means operative (a) to monitor the said outputs of the phase detectors thereby to obtain measurements of the distances of the mobile craft from the transmitting stations, operative (b) to compute the sum of the squares of the errors between the said measurements and corresponding distances derived from the content of the said storage means, operative (c) to compute a new set of parameters related to a new estimate of the position of the mobile craft such that the said sum of the squares of the errors is reduced to a minimum, operative (d) to place the said new set of parameters in the said storage means, operative (e) to calculate the mean error between the said measurements and corresponding distances compatible with the new estimate of the position of the mobile craft, and operative (f) to provide an output to control the said stable oscillator means so that the mean error is reduced to a minimum.

5. Radio navigational apparatus as claimed in claim 1 wherein said stable oscillator means includes a stable oscillator having phase-shifter means connected to the output thereof.

6. Radio navigational apparatus as claimed in claim 5 wherein said phase-shifter means comprises a goniometer the shaft of which is connected to said control means for controlling said stable oscillator means.

7. Navigational apparatus as claimed in claim 2 wherein said storage means is an integral part of the said computer means.

8. Navigational apparatus as claimed in claim 2, including an harmonic generator in said craft connected to the output of said stable oscillator means, and filter means in said craft for selecting harmonics of said reference frequency signal having the same frequencies as signals received from the transmitting stations.

9. Navigational apparatus as claimed in claim 8 wherein said phase detector means includes a plurality of phase detectors each connected to receive a signal derived from a different one of the transmitting stations and a signal of corresponding frequency from said filter means respectively.

10. Navigational apparatus as claimed in claim 4 wherein the said storage means is an integral part of the said computer means.

11. Radio navigational apparatus as claimed in claim 4 wherein said stable oscillator means includes a stable oscillator and phase-shifter means connected to the output of said stable oscillator.

12. Radio navigational apparatus as claimed in claim 11 wherein said phase-shifter means comprises a goniometer the shaft of which is connected to the means for controlling the stable oscillator means.

References Cited by the Examiner

UNITED STATES PATENTS

| | | | |
|---|---|---|---|
| 2,530,902 | 11/1950 | O'Brien | 343—105 |
| 2,581,438 | 1/1952 | Palmer | 343—103 X |
| 2,838,753 | 6/1958 | O'Brien et al. | |
| 3,076,192 | 1/1963 | Brown et al. | 343—112 |
| 3,150,372 | 9/1964 | Groth | 343—112 |

LEWIS H. MYERS, *Primary Examiner.*

CHESTER L. JUSTUS, *Examiner.*